United States Patent [19]

Wnukowski

[11] Patent Number: 4,965,930
[45] Date of Patent: Oct. 30, 1990

[54] INSULATOR INSTALLATION TOOL

[76] Inventor: Joseph T. Wnukowski, c/o Philadelphia Electric Co., 2301 Market St., P.O. Box 8699, Philadelphia, Pa. 19101

[21] Appl. No.: 392,418

[22] Filed: Aug. 11, 1989

[51] Int. Cl.⁵ .............................................. A47F 13/06
[52] U.S. Cl. ...................................... 29/758; 81/53.1; 254/134.3 R; 294/19.1
[58] Field of Search ................................ 29/758, 825; 254/134.3 R; 294/19.1, 22, 23; 81/53.1

[56] References Cited

U.S. PATENT DOCUMENTS

| | | | |
|---|---|---|---|
| 1,722,075 | 7/1929 | Coon | 294/19.1 |
| 1,865,526 | 7/1932 | Lawlor | 294/19.1 |
| 1,965,638 | 7/1934 | Gerhardt | 294/19.1 X |
| 2,739,832 | 3/1956 | Thorpe | 294/19.1 |
| 3,627,367 | 12/1971 | Levy . | |
| 3,759,472 | 9/1973 | Fratta . | |
| 3,866,965 | 2/1975 | Homeler . | |
| 3,868,136 | 2/1975 | Schweltzer . | |
| 3,959,869 | 6/1976 | Wyman . | |
| 4,079,978 | 3/1978 | McMullin . | |
| 4,132,441 | 1/1979 | Watkins . | |
| 4,189,828 | 2/1980 | Chadwick . | |
| 4,281,228 | 7/1981 | Harmon . | |
| 4,312,495 | 1/1982 | Dumbar . | |
| 4,326,316 | 4/1982 | Dolenti . | |
| 4,365,410 | 12/1982 | Houston . | |
| 4,423,853 | 1/1984 | Davis, Sr. . | |
| 4,494,732 | 1/1985 | Waymire . | |
| 4,695,039 | 9/1987 | Clossen . | |

OTHER PUBLICATIONS

E. L. MacMullin, U.S. Pat. (Abstract) No. 2,980,456, Apr. 1961, pp. 819–820,

*Primary Examiner*—Carl E. Hall
*Attorney, Agent, or Firm*—Paul and Paul

[57] ABSTRACT

A tool for installing a string of insulator discs in an energized high voltage line is mounted on a hot stick. The tool comprises a pair of pivoting jaws adapted to securely grasp a string of insulators, and a hook mounted on one of the jaws for suspending the tool from the energized line. The improved tool allows a single worker to grasp an insulator disc string with the tool and suspend the disc string near an energized line. Subsequently, this worker can assist in fastening the cable clamps of the insulator string to the energized line.

3 Claims, 2 Drawing Sheets

INSULATOR INSTALLATION TOOL

BACKGROUND OF THE INVENTION

1. Field of the Invention

This invention relates generally to high voltage power supply lines, and more specifically to tools for use in connection with high voltage lines and methods for using those tools.

2. Brief Description of the Prior Art

At voltages less than about 7.6 kilovolts, a worker wearing appropriate protective gear can handle energized lines directly. With lines at higher voltages, however, a different approach must be employed to guard against high voltage hazards. Frequently, workers who manipulate lines carrying such higher voltages use tools which are mounted at the end of "hot sticks". These are insulated poles extending about eight feet or more in length. Hot stick-mounted tools are adapted to a variety of tasks. For example, U.S. Pat. No. 4,326,316 discloses a hot stick-mounted rotary brush for cleaning aerial conductors; U.S. Pat. No. 4,132,441 relates to a hot stick-mounted head for removing fuse holders; and U.S. Pat. No. 3,866,965 discloses an attachment for facilitating manipulation of overhead wires with a hot stick. Similarly, U.S. Pat. Nos. 4,079,978 and 3,868,136 disclose improved hot sticks.

In working with high voltage power supply systems, it is frequently required that a section of line be deenergized. This is often accomplished by installing a string of insulator discs in an energized line. Typically, a string of discs having a pair of rigid extension bars extending from either end of the insulator string is used, the extension bars having multibolt cable clamps at their free ends. To install the insulator string, a hot stick equipped with a clamp adapted to securely engage the disc string proximate the center of the string is used. The disc string is clamped using the tool and held in the vicinity of the energized line by one worker, while two others secure each of the cable clamps to the energized line and subsequently sever the energized line in between the cable clamps using other hot stick-mounted tools. After both cable clamps have been secured to the energized line, the insulator clamp can be opened, since the insulator sting is then being suspended from the energized line by the cable clamps. This method of installing insulator strings disadvantageously requires three workers while the cable clamps are being fastened.

SUMMARY OF THE INVENTION

The present invention provides an improved tool for installing a string of insulator discs in an energized high voltage line and a method for using the tool. The improved tool is adapted for mounting on a hot stick and comprises a pair of pivoting jaws adapted to securely grasp a string of insulators and means mounted on one of the jaws for suspending the tool from an energized line, such as a hook formed from an insulating material. The improved tool allows a single worker to grasp an insulator disc string with the tool and suspend the disc string near an energized line. Subsequently, this same worker can assist in fastening the cable clamps to the energized line.

BRIEF DESCRIPTION OF THE DRAWINGS

FIG. 2b is an elevational view of a sting of disc insulators to be installed using the tool of FIG. 1 in the power line of FIG. 2a.

DETAILED DESCRIPTION OF THE PREFERRED EMBODIMENT

Figure 1:
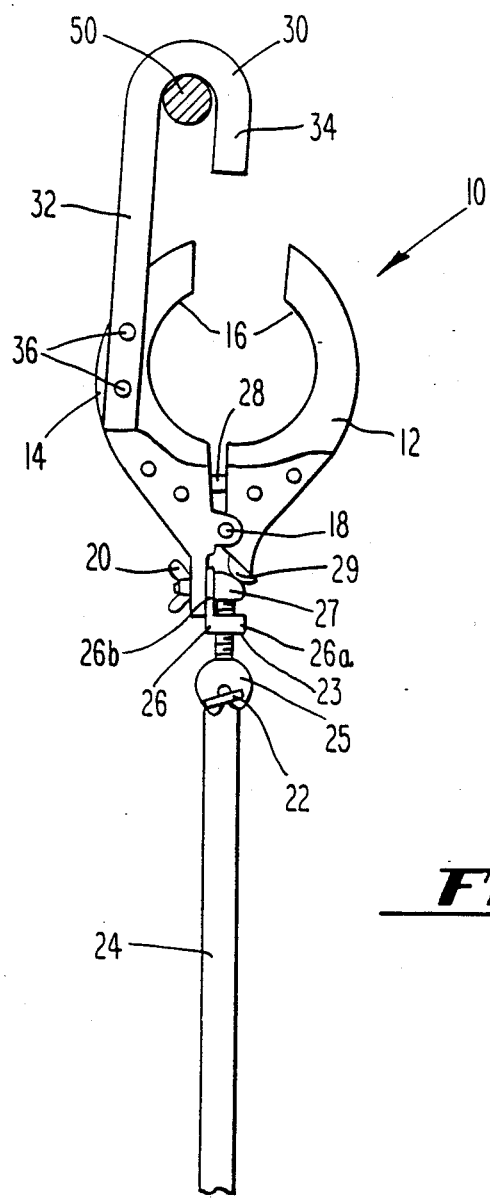
FIG. 1 is a front elevational view of a presently preferred embodiment of the tool of the present invention.

Referring now to the drawings in detail, wherein like reference numerals indicate like elements in each of the several views, reference is first made to FIG. 1, wherein an improved tool according to the present invention is illustrated in a front elevational view.

The tool 10 includes a first or movable jaw 12 and a second or stationary jaw 14. Each jaw 12, 14 comprises an upper section formed from an electrically insulating material and a lower section machined from a metal such as brass, the upper sections being bolted or riveted to the respective lower sections. The lower section of the stationary jaw 14 includes a yoke having a pair of aligned apertures formed therein for mounting a pivot pin or pivot 18. The yoke is adapted to receive a portion of the lower section of the movable jaw 12 likewise having an aperture formed therein for mounting the movable jaw 12 on the pivot 18 proximate one end of each jaw 12, 14. The first jaw 12 is adapted to rotate around the pivot 18 affixing the jaws 12, 14 together.

Figure 2A:
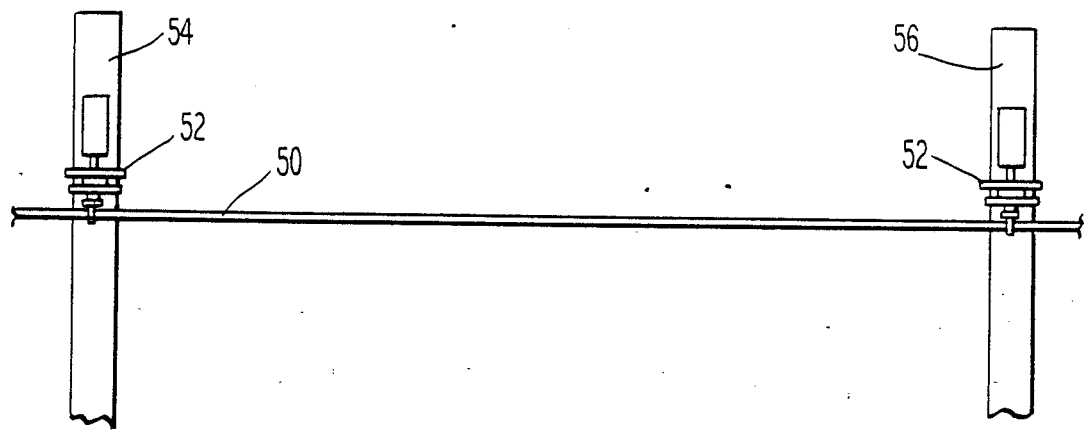
FIG. 2a is a fragmentary elevational view showing a high voltage power line suspended between a pair of poles.
Figure 2B:
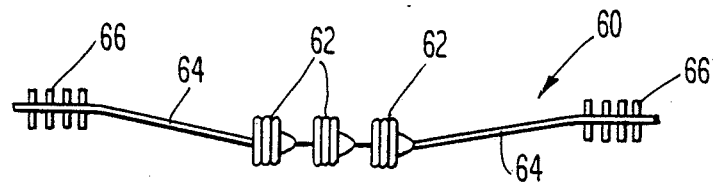
Figure 2C:
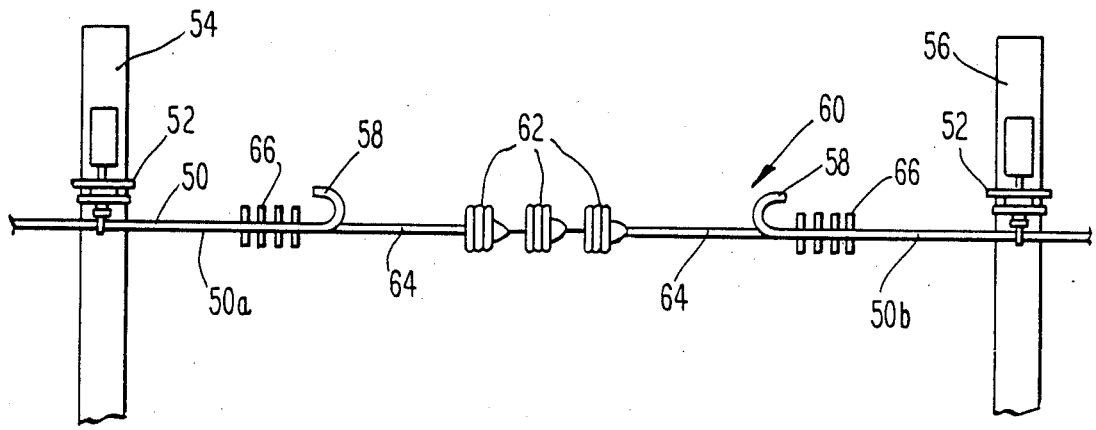
FIG. 2c is an elevational view showing the string of disc insulators of FIG. 2b installed in the power line of FIG. 2a using the tool of FIG. 1.

The interior surfaces 16 of the upper sections of the jaws 12, 14 are shaped and sized to receive and securely grasp an insulator disc string, such as that shown in FIG. 2b, when the jaws 12, 14 of the tool 10 are closed. The upper sections of the jaws can be formed from glass fiber-reinforced epoxy or the like, and are adapted to grasp the insulator disc string 60 in between a pair of insulator discs.

The tool 10 includes a base member 23 which is fastened to one end of a hot stick 24 by a first clamping means 22. The base member 23 includes a first or movable member 25 and a second or stationary member 26. The movable base member 25 has a generally "U"-shaped fork at one end thereof adapted to receive a bolt and be clamped to the upper end of the hot stick 24. The hot stick 24 has an aperture or hole proximate its upper end for receiving the bolt for clamping the tool 10. The movable base member 25 has a threaded rod or screw extending upward from the generally "U"-shaped fork and terminates in a generally triangular or wedged-shaped cap 27 to which it is rotatably affixed.

The stationary base member 26 is generally "L"-shaped and has a pair of legs extending perpendicular to one another. The first or lower leg 26a has a threaded aperture extending therethrough for receiving the threaded rod of the movable base member 25. The second or upper leg 26b has a slot extending therethrough for receiving a bolt to secure the cap 27 to the second or stationary jaw 14. The cap 27 has a pair of generally flat, mutually perpendicular sides which are each aligned generally parallel respective legs 26a, 26b of the stationary base member 26. The cap 27 is positioned to contact the first or movable jaw 12. The movable jaw 12 has a bearing plate 29 affixed at its lower edge to be contacted by the cap 27 of the movable member 25 of the base 23.

The second jaw 14 is clamped to the base 23 by a second clamping means 20 which permits the stationary jaw 14 to be clamped at an angle with respect to the axis of the base 25 (not shown) rather than along the axis of the hot stick 24. The second clamping means 20 permits the tool 10 to be angled as desired with respect to the hot stick 24, as may be necessary during installation of a string of disc insulators.

The jaws 12, 14 are biased apart by a spring 28 extending between the jaws 12, 14 proximate the pivot 18.

The jaws 12, 14 are opened and closed by rotation of the hot stick 24 around its longitudinal axis. As the hot stick 24 is rotated clockwise the threaded rod of the movable member 25 of the base 23 travels inward, pushing the cap 27 against the bearing plate 29 of the movable jaw 12, and forces the movable jaw 12 to rotate on the pivot 18 toward the stationary jaw 14, thus closing the jaws 12, 14. When the hot stick 24 is rotated counter-clockwise, the jaws 12, 14 are pushed apart by the spring 28.

Means 30 for suspending the tool 10 from an energized line 50, such as shown in FIG. 2a, is formed from a light, high strength material such as aluminum sheet stock. An electrically insulating material, such as thermoplastic or thermosetting synthetic polymeric material can be used if desired, provided the glass transition temperature of the material is sufficiently low so that the material does not become embrittled under low temperature operating conditions. The suspending means or hook 30 can be generally "J"-shaped, and is affixed to one of the jaws. For example, the suspending means 32 can be formed from flattened bar stock of a thermoplastic synthetic polymeric material bent into a "J" shape at an elevated temperature. In the embodiment shown in FIG. 1, the hook 30 is formed from aluminum stock and includes a flattened elongated shank 32 secured to the second jaw 14 by a pair of bolts 36 and extending generally parallel the center-line of the jaws 12, 14 (not shown). The hook 30 terminates in a generally semicircular tip 34 shaped and sized to engage an energized power line 50.

The tool 10 of the present invention can be advantageously used to install a string of insulators in an energized high voltage line. FIG. 2a illustrates a portion of such a high voltage line 50 extending between a pair of poles 54, 56 and suspended therefrom by suitable insulating means 52. In FIG. 2b a string of disc insulators 60 is shown, of the type commonly installed to insulate or deenergize a section of high voltage line. The string 60 includes three identical groups of insulator discs 62. A rigid extension bar 64 extends from either end to the string 60, and a multibolt cable clamp 66 is affixed at the free ends of the extension bars 64. To install the insulator string 60 an operator clamps the jaws 12, 14 of the tool 10 on the insulator string 60, such as between the largest and second largest disc of the middle group of insulator discs (not shown). Next the operator raises the clamped insulator string 60 to the vicinity of energized power line 50 using the hot stick 24, and positions the tool 10 proximate the line 50 by catching the line 50 with the hook 32. The operator is now free to assist in bolting each end of the string of insulator discs 60 to the energized line 50 using suitable hot stick-mounted means (not shown). After both ends of the string of insulator discs have been secured to the energized line 50, the line 50 can be severed using suitable ho stick-mounted severing means (not shown) at a position in between the cable clamps 66, to create an energized portion 50a of the line 50 and a deenergized portion 50b of the line 50. The tool 10 can then be released from the installed insulator string 60.

Other modifications and variations of the apparatus and method of the present invention will be readily apparent to those skilled in the art, all within the scope of the appended claims.

What is claimed is:

1. A hot stick mounted tool for use in installing an insulator string in an energized power line, comprising in combination (1) an electrical hot stick, (2) a tool for adjustably securely grasping an insulator disc string and maintaining the string in a position supported from an energized power line, said tool comprising in combination a pair of pivoting jaws, one jaw of said pair being stationarily mounted with respect to said hot stick, respective facing portions of said jaws being configured for grasping a series of disc insulators when said jaws are closed, hook means formed integrally with the stationarily mounted jaw and extending axially of said hot stick and sufficient distance beyond said jaws for engaging an energized power line while said jaws are in grasping relationship with the series of disc insulators, and spaced apart from said power line, and (3) means connecting said tool and hot stick whereby said pivoting jaws are adjusted to grasp said series of disc insulators by rotation of the hot stick around its longitudinal axis.

2. The tool of claim 1 in which the suspending means comprises a generally "J"-shaped hook.

3. The tool of claim 2 in which the hook is formed from aluminum.

* * * * *

UNITED STATES PATENT AND TRADEMARK OFFICE
CERTIFICATE OF CORRECTION

PATENT NO. : 4,965,930

DATED : October 30, 1990

INVENTOR(S) : Joseph T. Wnukowski

It is certified that error appears in the above-identified patent and that said Letters Patent is hereby corrected as shown below:

Column 2, Line 4, delete "sting" and substitute therefore --string--.

Column 4, Line 15, delete "ho" and substitute therefore --hot--.

Column 4, Line 34, after the word "stick", insert --the other jaw being movably mounted with respect to said hot stick,--.

Signed and Sealed this

First Day of December, 1992

Attest:

DOUGLAS B. COMER

*Attesting Officer*     *Acting Commissioner of Patents and Trademarks*